United States Patent [19]

Malec

[11] 4,186,102
[45] Jan. 29, 1980

[54] LUBRICATING OIL COMPOSITION

[75] Inventor: Robert E. Malec, Birmingham, Mich.

[73] Assignee: Ethyl Corporation, Richmond, Va.

[21] Appl. No.: 923,070

[22] Filed: Jul. 10, 1978

Related U.S. Application Data

[63] Continuation-in-part of Ser. No. 467,051, May 6, 1974, Pat. No. 4,117,011.

[51] Int. Cl.$^2$ .................... C10M 3/26; C07C 87/28
[52] U.S. Cl. .................... 252/51.5 R; 44/73; 252/52 A; 260/570.5 P; 260/570.6
[58] Field of Search .................... 44/73, 51; 252/DIG. 52 A, 51.5 R; 260/570.5

[56] References Cited

U.S. PATENT DOCUMENTS

| | | | |
|---|---|---|---|
| 3,368,972 | 2/1968 | Otto | 252/51.5 R |
| 3,413,374 | 11/1968 | Sato et al. | 260/672 R |
| 3,539,633 | 11/1970 | Piasek et al. | 260/570.5 |
| 3,647,691 | 3/1972 | Vineyard | 252/51.5 R |
| 3,787,458 | 1/1974 | Piasek et al. | 252/51.5 R |
| 3,798,165 | 3/1974 | Piasek et al. | 252/51.5 R |
| 3,877,889 | 4/1975 | Dix | 44/73 |

*Primary Examiner*—Patrick Garvin
*Assistant Examiner*—Raymond K. Covington
*Attorney, Agent, or Firm*—Donald L. Johnson; Robert A. Linn; Joseph D. Odenweller

[57] ABSTRACT

The reaction product of (a) high molecular weight hydrocarbon-substituted phenols, (b) aldehydes, (c) ammonia or amines having a reactive hydrogen atom, and (d) alkylene oxides are effective dispersants for lubricating oil and impart detergent properties to liquid hydrocarbon fuels such as gasoline.

17 Claims, No Drawings

LUBRICATING OIL COMPOSITION

CROSS REFERENCE TO RELATED APPLICATION

This application is a Continuation-in-Part of Ser. No. 467,051, filed May 6, 1974 now U.S. Pat. No. 4,117,011.

BACKGROUND

Mannich condensation products of high molecular weight hydrocarbon-substituted phenols, aldehydes and reactive amines are known detergent-dispersants in lubricating oil and liquid hydrocarbon fuels. Their preparation and use are described in Otto, U.S. Pat. Nos. 3,368,972 and 3,649,229; Worrel, 3,413,374; and Piasek et al, 3,539,633 and 3,798,165. A Mannich gasoline detergent made using a hydroxyalkyl amine and its alkoxylated derivatives is described in Dix, U.S. Pat. No. 3,877,889.

SUMMARY OF THE INVENTION

According to the present invention, Mannich condensation products are obtained having excellent dispersant-detergent properties in lubricating oil and liquid hydrocarbon fuels which also have improved corrosion properties by reacting (a) high molecular weight (over 650) hydrocarbon-substituted phenols, (b) aldehydes, and (c) ammonia or an amine having a reactive hydrogen atom, and (d) alkylene oxides.

DESCRIPTION OF THE PREFERRED EMBODIMENTS

A preferred embodiment of the invention is a dispersant-detergent composition made by the process comprising reacting (a) one mole part of an aliphatic hydrocarbon-substituted phenol wherein said aliphatic hydrocarbon substituent has an average molecular weight of from about 650 to 5000, (b) from about 1 to 10 mole parts of a $C_{1-4}$ aldehyde, (c) from about 0.1 to 10 mole parts of a nitrogen compound selected from the group consisting of ammonia and amines containing at least one HN< group and containing from 1 to about 20 carbon atoms, and (d) from about 0.1 to 50 mole parts of an alkylene oxide containing from 2 to about 6 carbon atoms.

Representative high molecular weight aliphatic hydrocarbon-substituted phenols useful in this invention can be prepared by reacting phenol with a polyolefin having an $\overline{M}n$ of about 650 to about 100,000, and more preferably about 650 to about 5000, using a $BF_3$ catalyst in the form of a phenate. A highly preferred polyolefin substituent has an $\overline{M}n$ of about 850–1500. The most useful polyolefins are the homopolymers and copolymers of lower monoolefins such as ethylene, propylene and isobutylene. Thus, useful aliphatic hydrocarbon substituents include polyethylene, polypropylene and polybutene substituents having an $\overline{M}n$ of about 650 to 100,000, and preferably 650 to about 5000. Useful copolymer substituents include ethylene-propylene copolymers, ethylene-propylene-isobutylene terpolymer, ethylene-isobutylene copolymer, propylene-isobutylene copolymer, and the like. The most preferred hydrocarbon-substituted phenols are polybutene and polypropylene-substituted phenols.

The aliphatic hydrocarbon substituent is substantially saturated but may contain a small amount, up to about 5 percent, of unsaturated carbon-carbon bonds. These occur when the polyolefin substituent is derived from a mixture of lower olefins containing a small amount of diene, such as 1,3-butadiene, 2-methyl-1,3-butadiene, and the like. Also, small amounts of non-hydrocarbon substituents on the aliphatic substituent, such as mercapto, sulfide, di-sulfide, hydroxide, chloride, and the like, not in excess of about 5 percent of the hydrocarbon substituent, which do not detract from the essential hydrocarbon character of the substituent are not detrimental.

Useful aldehydes include formaldehyde, acetaldehyde, propionaldehyde, butyraldehyde, isobutyraldehyde, and the like. The most preferred aldehyde is formaldehyde, including formaldehyde-forming materials such as paraformaldehyde.

Ammonia or any of a broad range of amines can be used as the nitrogen compound. All that is required is that the amine contain at least one HN< group such that it can enter into the well-known Mannich condensation reactions. Such amines may contain only primary amino groups, only secondary amino groups, or both primary and secondary amino groups. Typical amines are the polyalkyl polyamines, ethylene diamine, propylene diamine, polyalkylene polyamines, aromatic amines including o-, m- and p-phenylene diamines, di-amino naphthalenes, and acid-substituted polyalkylene polyamines such as N-acetyltetraethylenepentamine and the corresponding formyl-, propionyl-, butyryl-, and the like N-substituted compounds. Also included are cyclized compounds formed therefrom such as the N-alkyl amines of imidazolidine and pyrimidine. Secondary heterocyclic amines which are suitable are those characterized by attachment of a hydrogen atom to a nitrogen atom in the heterocyclic group. Representatives of cyclic amines contemplated are morpholine, thiomorpholine, pyrrole, pyrroline, pyrrolidine, indole, pyrazole, pyrazoline, pyrazolidine, imidazole, imidazoline, imidazolidine, piperidine, piperazine, phenoxazine, phenthiazine, and their substituted analogs. Substituent groups attached to the carbon atoms of these amines are typically alkyl, aryl, alkaryl, aralkyl, cycloalkyl, and amino compounds referred to above.

Although amines containing a large hydrocarbon group are useful, such as polypropylene ($\overline{M}n$ 1000) amine, polybutene ($\overline{M}n$ 1200) amine, N-polypropylene ($\overline{M}n$ 900) ethylene diamine, N-polybutylene ($\overline{M}n$ 1500) ethylene diamine, the preferred amines contain at least one reactive amine hydrogen atom and from 1 to about 20 carbon atoms. Illustrative examples of these include methyl amine, dimethyl amine, ethyl amine, diethyl amine, N-propyl amine, isobutyl amine, N-hexyl amine, 2-ethylhexyl amine, N-decyl amine, N-dodecyl amine, N-eicosyl amine, ethylenediamine, 1,3-propanediamine, tetraethylenepentamine, 1,6-hexanediamine, piperidine, piperazine, cyclohexyl amine, aniline, phenylenediamine, N-isopropyl phenylenediamine, and the like.

A highly preferred class of amine reactants are the alkylene polyamines which have the formula $H_2N(R_1-NH)_{\overline{n}}H$ wherein n is an integer from 1 to about 6 and $R_1$ is a divalent hydrocarbon group containing 2 to about 4 carbon atoms. These compounds and their method of preparation are discussed at length in Kirk-Othmer, *Encyclopedia of Chemical Technology*, Vol. 5, pp. 898–9, Interscience Publishers, Inc., New York. These include the series ethylene diamine, diethylene triamine, triethylenetetramine, tetraethylenepentamine, pentaethylenehexamine, and the like. Of these alkylene polyamines, a most preferred reactant is tetraethylenepentamine or a mixture containing mainly tetraethylenepentamine or having an average composition corresponding to tetraethylenepentamine. Such a material is commercially available from Carbide Chemical Company under the tradename "Polyamine H". Corresponding propylene polyamines such as propylenediamine, dipropylenetriamine, tripropylenetetramine, tetrapropylenepentamine, and the like, are also suitable. These alkylene polyamines are readily obtained by the reaction of ammonia with dihalo alkanes such as dichloro alkanes.

Also suitable are condensation products of urea or thiourea and the alkylene polyamines wherein for each mole part of urea or thiourea two mole parts of alkylenepolyamine are used.

Another preferred class of amine reactants is the N,N-dialkyl alkane diamines. These compounds have the formula:

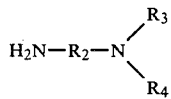

wherein $R_2$ is a divalent lower alkane group containing 2 to about 6 carbon atoms and $R_3$ and $R_4$ are independently selected from $C_{1-4}$ alkyl groups. Representative examples include N,N-dimethyl-1,3-propanediamine, N,N-diethyl-1,2-ethanediamine, N,N-di-n-butyl-1,6-hexanediamine, and the like.

Another useful class of amine reactants is the alkanol amines. These are primary or secondary amines having at least one alkanol group bonded to the amine nitrogen atom. The alkanol groups contain from 2 to about 6 carbon atoms. These compounds can be represented by the formula:

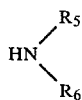

wherein $R_5$ is an alkanol group preferably containing 2 to about 6 carbon atoms and $R_6$ is selected from hydrogen, lower alkyls containing 1–4 carbon atoms, and alkanol groups containing 2–6 carbon atoms. Representative examples are ethanol amine, diethanol amine, ethanol methyl amine, hexanol amine, dihexanol amine, and the like. Of these, the preferred amines are the ethanol amines such as diethanol amine.

Alkylene oxides include those containing from 2 to about 6 carbon atoms, such as ethylene oxide, propylene oxide, 1,2-butene oxide, isobutylene oxide, 1,2-hexene oxide, and the like.

The preferred ratio of reactants used in making the product is one mole part of hydrocarbon-substituted phenol:1–10 mole parts of aldehyde:0.1–10 mole parts of ammonia or amine:0.1–50 mole parts of alkylene oxide.

The reaction temperature can vary over a wide range. All that is required is that the temperature be high enough to cause the reaction to proceed at a reasonable rate, but not so high as to cause thermal decomposition. A useful temperature range is from about 50° to 250° C. Frequently the initial portion of the reaction is conducted at the lower end of this temperature range and the mixture is gradually heated to over 100° C. towards the end to distill out water formed during the reaction. The reaction with alkylene oxide proceeds readily at temperatures as low as 25° C. and lower, although a preferred temperature range for this part of the reaction is from about 50° to 200° C.

The reactants can be combined by various methods. The hydrocarbon-substituted phenol, aldehyde and amine can be initially reacted and the alkylene oxide reaction conducted in a second step. Alternatively, the alkylene oxide may be reacted with the hydrocarbon-substituted phenol and the resultant product reacted with aldehyde and ammonia or amine. Good results are also obtained by initially reacting the hydrocarbon-substituted phenol with aldehyde and then reacting the mixture with ammonia or amine and finally reacting the product with the alkylene oxide. A highly preferred method of preparing the reaction product is to first react the hydrocarbon-substituted phenol, aldehyde and ammonia or amine in any sequence, or all at once, and then in a later step to react the alkylene oxide with the first obtained reaction product.

The following examples serve to illustrate the manner by which the present products can be made.

EXAMPLE 1

To a reaction vessel equipped with a stirrer, condenser and thermometer was added 363 parts of polybutene having an average molecular weight of 1100 and 94 parts of phenol. Over a period of 3 hours, 14.2 parts of a $BF_3$-etherate complex were added while maintaining the reaction temperature between 50° and 60° C. The reaction mixture was then stirred at 55°–60° C. for an additional 4.5 hours and then transferred to a second reaction vessel containing 750 parts of water. The aqueous phase was removed and the organic phase washed 4 times with 250 parts of water at 60° C., removing the aqueous phase after each wash. The organic product was then diluted with about 200 parts of n-hexane and dried with anhydrous sodium sulfate. The product was then filtered and the hexane and other volatiles removed by vacuum distillation until the product remaining was at 75° C. at 0.3 mm Hg. As a reaction product, there was obtained 368.9 parts of an alkylphenol as a viscous amber-colored oil having an average molecular weight of 810.

In a separate reaction vessel was placed 267 parts of the alkylphenol prepared above, 33.6 parts of N,N-dimethyl-1,3-propanediamine and 330 parts of isopropanol. While stirring, 15.8 parts of 95 percent paraformaldehyde was added. The reaction mixture was then refluxed for 6.5 hours. Following this, the solvent and other volatiles were distilled out to a reaction mass temperature of 115° C. at about 15 mm Hg. The reaction mass was a viscous amber-colored liquid.

To a 284 gram portion of the above product was added 10 grams of propylene oxide and the mixture stirred for 4.75 hours while heating slowly from 35° to 90° C. The product was an effective dispersant-detergent of this invention.

EXAMPLE 2

The above procedure was repeated to prepare 558 grams of polybutylphenol-formaldehyde-N,N-dimethyl-1,3-propanediamine reaction product. To this was added 26 grams of propylene oxide and the mixture heated at 90°–105° C. for 1.25 hours using a "Dry Ice" filled condenser to avoid loss of propylene oxide. The resultant product was an effective dispersant-detergent.

EXAMPLE 3

In a reaction vessel was placed 169 grams of phenol, 500 grams of heptane and 920 grams of polybutene ($\overline{M}n$ 920). This was stirred and heated to 40° C. and 40 grams of BF$_3$.2-phenol added. Stirring was continued for one hour at 50° C. and then the mixture was washed with a solution of 14.3 vol. % concentrated ammonium hydroxide, 28.6 vol. % water and 57.1 vol. % methanol. The mixture was washed a second time with 57.1 vol. % methanol in water. The washed polybutene-substituted phenol was heated to 35° C. and 300 grams of tetraethylenepentamine and 72 grams of paraformaldehyde added. This was stirred for 6.75 hours while gradually heating to 175° C. Full aspirator vacuum was applied during the last two hours after the mixture reached 130° C. to remove volatiles.

A concentrate was prepared by blending 600 grams of the above product with 300 grams of mineral oil.

A 798 gram portion of the concentrate was placed in a reaction vessel and, while stirring, ethylene oxide was bubbled through it for 2.5 hours at 90°–120° C. A weight increase of 48 grams was obtained. The final product was water washed and volatiles removed by heating under vacuum. The product was an effective dispersant-detergent.

EXAMPLE 4

In a reaction vessel was placed 920 grams of polybutene ($\overline{M}n$ 920), 169 grams of phenol and 500 grams of heptane. The mixture was stirred and heated under nitrogen to 45° C. Then, 40 grams of BF$_3$.2 phenol complex was added and the mixture stirred at 50° C. for one hour. The polybutene-substituted phenol product was then washed in the manner of Example 3.

The product was transferred to a second reaction vessel and 50 grams of diethylenetriamine was added at 35° C. The mixture was stirred and then 36 grams of paraformaldehyde was added. While stirring, the resultant mixture was gradually heated to a temperature of 180° C. over a 7 hour period. Aspirator vacuum was applied after 5 hours when the mixture attained 130° C. The product weighed 1051 grams and was diluted with 526 grams of mineral oil to give a 66.6 percent active concentrate.

A 1035 gram portion of the above concentrate was placed in a reaction vessel and heated to 65° C. Ethylene oxide was bubbled through this for 3 hours while raising the temperature gradually to 120° C. A 44 gram weight increase was observed. One-half of this product was removed and 11 grams of diluent mineral oil added to it to maintain a 66.6 percent active concentrate.

EXAMPLE 5

In a reaction vessel was placed 1318 grams of a 74.7 weight percent solution of polybutene ($\overline{M}n$ 920) substituted phenol in heptane, 52 grams of diethylenetriamine and 36 grams of paraformaldehyde. While stirring, the mixture was gradually heated to 185° C. over a 7 hour period. Aspirator vacuum was applied after 4.5 hours when the mixture reached 100° C. The product weighed 1037 grams and was diluted with 518 grams of mineral oil to give a 66.6 percent active concentrate.

A 409 gram portion of the above concentrate was placed in a second reaction vessel and heated to 90° C. While stirring, ethylene oxide was bubbled into this for 1.5 hours at 90°–120° C. A 19 gram weight increase was observed.

The product was diluted with an equal volume of heptane and washed with water. Remaining volatiles were distilled out under vacuum leaving a clear brown viscous oil which had excellent dispersant-detergent properties.

EXAMPLE 6

To a reaction vessel was added 659 grams of a 74.7 weight percent solution of a polybutene ($\overline{M}n$ 920) substituted phenol in heptane, 105 grams of diethanolamine and 36 grams of paraformaldehyde. The mixture was stirred and gradually heated over a 7 hour period to 185° C. At 4.5 hours and 75° C., aspirator vacuum was applied to aid in removal of volatiles. There was obtained 607 grams of reaction product. To this was added 303 grams of mineral oil to form a 66.6 percent active concentrate. Ethylene oxide was bubbled into this product for 4 hours at 100°–120° C. A weight gain of 50 grams was observed. The final product was diluted with an equal volume of heptane, washed with water, and then the heptane distilled out under vacuum.

In the above Examples 1-6 other high molecular weight aliphatic hydrocarbon-substituted phenols may be employed in place of the polybutene-substituted phenol with similar results. For example, polypropylene-substituted phenols of the stated molecular weight range are very useful. Likewise, other aldehydes such as acetaldehyde, propionaldehyde and butyr aldehyde may be substituted for the formaldehyde used with good results. Ammonia (including ammonia-producing compounds such as ammonium carbonate) and amines having a reactive hydrogen can be substituted for the amines used in the examples.

The following example illustrates the preparation of the additive in which the alkylene oxide reaction is conducted at an earlier stage.

EXAMPLE 7

In a pressure reaction vessel place 1294 grams of polypropylene ($\overline{M}n$ 1200) substituted phenol and 220 grams of ethylene oxide. Seal and heat to 150° C. and stir at that temperature for 2 hours. Cool to 30° C. and vent. Add 40 grams of paraformaldehyde and, while stirring, heat to 100° C. for 30 minutes. Cool to 50° C. and add 200 grams of a mixture of ethylene polyamine consisting mainly of tetraethylenepentamine containing smaller amounts of triethylenetetramine and pentaethylenehexamine and other such polymers. Stir while heating gradually to 180° C. over a 6 hour period. Apply vacuum (appx. 50 mm Hg) at 80° C. after about 4 hours of heat-up. Cool, dilute with an equal volume of heptane, water wash, and vacuum strip to remove volatiles and obtain a useful detergent-dispersant.

The additives are very effective ashless dispersants in lubricating oil. In this use they are not only effective in dispersing sludge, but generally cause less corrosion than frequently occurs with similar Mannich condensation products. Engine tests were carried out to confirm this. One such test was the L-43 Sludge and Varnish test which measures the ability of the additive to inhibit the formation of sludge and varnish in an engine under moderate temperature conditions. In this test, a single cylinder engine is operated at a coolant temperature varying from 120° to 200° F. and an oil gallery temperature of about 150° F. In a standard L-43 test the engine is operated for 180 hours and then disassembled and various parts rated on a scale of 0-10 (10 equals clean) to give an average sludge and varnish rating. This standard test was modified by periodically disassembling the engine during the test and determining the hours to an average No. 9 sludge or varnish rating. The longer the time to this rating the better the additive. The test oil contained 1.5 weight percent of a phenolic antioxidant ("Ethyl" Antioxidant 728, trademark Ethyl Corporation) to prevent oxidative failure of the oil.

The following table gives the results obtained in the modified L-43 test using the present additives.

| | L-43 ENGINE TESTS | | |
|---|---|---|---|
| | Concentration | Hrs. to 9.0 Rating | |
| Additive | (wt % active) | Sludge | Varnish |
| Example 4 | 0.82 | 100 | 80 |
| Example 5 | 0.82 | 104 | 111 |
| Succinimide[a] | 0.82 | 88.5 | 61 |

[a] A commercial ashless dispersant

The above results show that the present dispersants are more effective in preventing low temperature sludge and varnish than a commonly used commercial succinimide dispersant.

Another series of tests was carried out to determine the corrosivity of oil containing the test dispersants. Frequently an ashless dispersant will render an oil more corrosive (as measured by bearing weight loss, BWL) than the same oil not containing the dispersant. This problem has been especially severe with previous Mannich condensation products. The effect of the present additives was determined using an L-38 engine test. The test period was shortened from the standard 40 hours to 10 hours. The L-38 test is a high temperature engine test (coolant 200° F., oil gallery 290° F.) and is used to measure high temperature sludge and varnish and BWL. Only the BWL was measured in the present L-38 test. The oil was an SAE-20 mineral oil containing 1.4 weight percent commercial zinc dialkyl dithiophosphate, 1.3 weight percent commercial overbased calcium sulfonate and 0.6 weight percent commercial overbased magnesium sulfonate. The following table shows the results obtained in these tests.

| | L-38 ENGINE TESTS | |
|---|---|---|
| Additives | Concentration (Wt % active) | BWL (mg) |
| None | — | 10.5 |
| Example 1 | 1.8 | 78 |
| Example 2 | 1.8 | 72 |
| Example 3 | 1.8 | 55 |
| Example 4 | 1.8 | 30 |
| Example 5 | 1.8 | 37.4 |
| Examples 1 and 2 before alkylene oxide reaction | 1.8 | 126.9 |
| Example 3 before ethylene oxide reaction | 1.8 | 94 |
| Example 4 before ethylene oxide reaction | 1.8 | 60 |

These results show that the present additives cause far less bearing corrosion than a similar Mannich condensation product not embodying the alkylene oxide reaction.

The additives are useful as ashless dispersants in a broad range of lubricating oils, both synthetic and mineral. For example, they may be beneficially used in synthetic ester type lubricating oils such as the $C_{6-10}$ alkanol esters of aliphatic dicarboxylic acids (e.g., adipic, sebacic, and the like) such as, for example, di-2-ethylhexyl sebacate. They may also be used with complex ester lubricants such as those made by the reaction of polyols (e.g., ethyleneglycol, pentaerythritol, trimethylolpropane, and the like), polycarboxylic acids (e.g., adipic, sebacic, and the like), monocarboxylic $C_{4-10}$ aliphatic acids (e.g., hexanoic, octanoic and decanoic, and the like), and monohydric alkanols (e.g., butanol, hexanol, octanol, and the like).

They are also useful in synthetic hydrocarbon oil made by polymerizing olefinically unsaturated hydrocarbons such as styrene, isobutene, butene, hexene, octene, decene, dodecene, and the like. The preferred oils of this type are oligomers of $C_{6-12}$ straight-chain alpha-monoolefins (e.g., decene-1) consisting of a high percentage of trimer. These synthetic oils are preferentially hydrogenated to improve stability. They are also useful in synthetic alkylbenzene oils such as didodecyl benzene, dioctadecyl benzene, and the like.

The additives are most useful in mineral lubricating oils or blends of mineral lubricating oil with synthetic oils. The mineral oils may be refined from any type of base stock including Pennsylvania, midcontinent, Gulf coast, California, and the like.

The amount of dispersant added should be an amount sufficient to impart the required degree of dispersancy. A useful range is from about 0.1 to 10 weight percent additive product (i.e., excluding diluent oil in the concentrate). A preferred range is from about 1-5 weight percent.

The lubricating oil may also contain other additives normally included in lubricating oil formulations such as zinc dialkyldithiophosphates, calcium alkarylsulfonates, magnesium alkarylsulfonates, phosphosulfurized olefins (e.g., $P_2S_5$-terpene reaction product), barium salts of phosphosulfurized olefins, V.I. improvers (e.g., polylauryl methacrylates, polybutenes, styrene-butene copolymers, ethylene-propylene copolymers, and the like), antioxidants (e.g., α-dimethylamino-2,6-di-tert-butyl-p-cresol, 4,4'-methylenebis(2,6-di-tert-butylphenol) and the like), metal phenates (e.g. barium alkylphenates, calcium alkyl phenates, zinc alkylphenates, and the like), and other commonly used additives.

The following example illustrates the preparation of a mineral lubricating oil useful in operation of an automotive type internal combustion engine.

EXAMPLE 8

In a blending vessel place 10,000 gallons of SAE-10 mineral lubricating oil. To this add 2 weight percent of the product of Example 4, 3 weight percent ethylene propylene copolymer V.I. improver, 0.7 weight percent zinc as zinc dialkyldithiophosphate, 1.3 weight percent overbased calcium alkaryl sulfonate, 0.6 weight percent overbased magnesium alkaryl sulfonate, and 0.3 weight percent 4,4'-methylenebis(2,6-di-tert-butylphenol). Stir until a homogenous solution is obtained resulting in a useful automotive engine lubricant.

The additives are also useful in liquid hydrocarbon fuels such as distillate fuel oil, diesel fuels and gasoline. They help in suppressing sludge formation in distillate fuels during storage. They also are beneficial in preventing diesel injector plugging. In gasoline they help maintain a clean carburetor and clean intake valves.

Liquid hydrocarbon fuels of the gasoline boiling range referred to as gasoline are mixtures of hydrocarbons having a boiling range of from about 80° F. to about 430° F. Of course, these mixtures can contain individual constituents boiling above or below these figures. These hydrocarbon mixtures contain aromatic hydrocarbons, saturated hydrocarbons and olefinic hydrocarbons. The bulk of the hydrocarbon mixture is obtained by refining crude petroleum by either straight distillation or through the use of one of the many known refining processes, such as thermal cracking, catalytic cracking, catalytic hydroforming, catalytic reforming, and the like. Generally, the final gasoline is a blend of stocks obtained from several refinery processes. The final blend may also contain hydrocarbons made by other procedures such as alkylate made by the reaction of $C_4$ olefins and butanes using an acid catalyst such as sulfuric acid or hydrofluoric acid.

Preferred gasolines are those having a Research Octane Number of at least 85. A more preferred Research Octane Number is 90 or greater. It is also preferred to blend the gasoline such that it has a content of aromatic hydrocarbons ranging from 10 to about 60 volume percent, an olefinic hydrocarbon content ranging from 0 to about 30 volume percent, and a saturate hydrocarbon content ranging from about 40 to 80 volume percent, based on the whole gasoline.

The classification of gasoline components into aromatics, olefins and saturates is well recognized in the art. Procedures for analyzing gasolines and gasoline components for hydrocarbon composition have long been known and used. Commonly used today is the FIA analytical method involving fluorescent indicator adsorption techniques. These are based on selective adsorption of gasoline components on an activated silica gel column, the components being concentrated by hydrocarbon type in different parts of the column. Special fluorescent dyes are added to the test sample and are also selectively separated with the sample fractions to make the boundaries of the aromatics, olefins and saturates clearly visible under ultraviolet light. Further details concerning this method can be found in "1969 Book of ASTM Standards," January 1969 Edition, under ASTM Test Designation D 1319-66T.

The motor gasolines used in formulating the improved detergent fuels of this invention generally have initial boiling points ranging from about 80° to about 105° F. and final boiling points ranging from about 380° to about 430° F. as measured by the standard ASTM distillation procedure (ASTM D-86). Intermediate gasoline fractions boil away at temperatures within these extremes.

The amount of the detergent added to the fuel should be at least sufficient to exert some detergent action in the fuel induction system. In other words, it should be a detergent amount. Detergent action is generally attained when the fuel contains from about 5-2000 ppm (parts per million) of the new detergent, and more preferably, when it contains from about 10-500 ppm.

The gasoline may contain any of the other additives normally employed to give fuels of improved quality such as tetraalkyllead antiknocks including tetramethyllead, tetraethyllead, mixed tetraethyltetramethyl lead, and the like. They may also contain antiknock quantities of other agents such as cyclopentadienyl nickel nitrosyl, methylcyclopentadienyl manganese tricarbonyl, and N-methyl aniline, and the like. Antiknock promoters such as tert-butyl acetate may be included. Halohydrocarbon scavengers such as ethylene dichloride, ethylene dibromide and dibromo butane may be added. Phosphorus-containing additives such as tricresyl phosphate, methyl diphenyl phosphate, diphenyl methyl phosphate, trimethyl phosphate, and tris($\beta$-chloropropyl)-phosphate may be present. Antioxidants such as 2,6-di-tert-butylphenol, 2,6-di-tert-butyl-p-cresol, phenylenediamines such as N-isopropylphenylenediamine, and the like, may be present. Likewise, the gasoline can contain dyes, metal deactivators, or any of the additives recognized to serve some useful purpose in improving the gasoline quality.

A preferred embodiment of the invention is a liquid hydrocarbon fuel of the gasoline boiling range containing a detergent amount of the new detergent of this invention and from about 0.25 to 4 grams per gallon of lead as tetraethyllead or tetramethyllead. A still further embodiment of the invention is a liquid hydrocarbon fuel of the gasoline boiling range containing a detergent amount of the new detergent of this invention and from about 0.005 to 3, more preferably 0.005 to 0.5, grams of manganese per gallon as methylcyclopentadienyl manganese tricarbonyl.

A highly preferred embodiment of this invention is a liquid hydrocarbon fuel of the gasoline boiling range as previously described containing in addition to the detergent additive a small amount of a mineral oil. This embodiment is particularly advantageous in promoting the cleaning of intake valves and stems. The amount of oil added can be any amount from about 0.05 to about 0.5 volume percent, based on the final gasoline. Although the oil adjuvant can be any of the well-known mineral oils including those obtained from Pennsylvania, mid-continent, Gulfcoast, or California crudes, the more preferred are the naphthenic mineral oils. The viscosity of the mineral oil can vary from about 100 to 2000 SUS at 100° F.

In another preferred embodiment a synthetic olefin oligomer is used in place of or together with the mineral oil adjuvant. These oligomers are prepared by the polymerization of aliphatic monoolefinic hydrocarbons such as ethylene, propylene, butene, decene-1, and the like. These result in such adjuvants as liquid polyethylene, polypropylene, polybutene, ethylene-propylene copolymer, $\alpha$-decene trimer, $\alpha$-decene tetramer and mixtures of the proper average molecular weight. Useful polymerization catalysts include both the Lewis acid type such as aluminum chloride, boron trifluoride, etc., as well as the metal alkyl types such as triethyl aluminum, diethyl aluminum chloride, methyl aluminum sesquichloride, diethyl zinc, either alone or in combination with a metal salt modifier such as titanium tetrachloride or cobalt iodide. Means of carrying out the polymerization of the simple olefin monomers are well known.

The polymerization should be carried out until the olefin forms a normally liquid oligomer having an average molecular weight of from about 300 to 2000, especially 350-1500. The oligomers of this molecular weight range have the greatest effect in promoting the cleaning of intake valves when used in combination with a detergent of this invention.

In an especially preferred embodiment the polyolefin adjuvant is a normally liquid olefinic hydrocarbon having an average molecular weight of from about 350 to about 1500 and is made by the polymerization of a mixture of aliphatic monoolefins containing at least 12 carbon atoms. Preferably the monoolefins used to prepare this polyolefin adjuvant contain from about 12-32 carbon atoms and are predominantly alpha olefins. More preferred olefin hydrocarbons are those obtained by polymerizing a mixture of even numbered, predominantly alpha-monoolefins having from 12 to about 32 carbon atoms using a Friedel-Crafts catalyst. Preferred Friedel-Crafts catalysts are aluminum chloride, aluminum bromide, and boron trifluoride. Preferred reaction temperatures are 20° C.–120° C. A most preferred polymerization process is carried out at temperatures ranging from about 40° C. to about 110° C., using an aluminum halide catalyst in the absence of any lower alkyl ($C_1$-$C_6$) monohalide.

These poly-$C_{12+}$ olefin adjuvants are non-aromatic, normally liquid olefin hydrocarbons characterized by having an average molecular weight ranging from 350 to about 1500. By normally liquid is meant that the olefin hydrocarbon is fluid at room temperature. These olefin hydrocarbons include cyclic olefin hydrocarbons as well as branched chain and straight chain olefin hydrocarbons.

The additives of this invention can be added directly to gasoline or they can be added in the form of a concentrate. Thus, another embodiment of the invention is a gasoline detergent concentrate containing an additive amount of a detergent of this invention and a diluent. The amount of detergent in the concentrate can vary from about 10–90 weight percent. A preferred concentration is from about 35–75 weight percent. The diluent serves to maintain the concentrate in a liquid form making it easy to handle and to meter into gasoline blending systems. Preferred diluents are hydrocarbons including both aliphatic and aromatic hydrocarbons such as hexane, heptane, octane, petroleum ether, kerosene, benzene, toluene, xylene, and the like, including mixtures thereof. A more preferred diluent is a higher boiling hydrocarbon such as a mineral oil or polyolefin oligomer. The advantage of using these higher boiling hydrocarbon diluents is that these higher boiling hydrocarbons also serve as the previously-described mineral oil or polyolefin adjuvants. Thus, a preferred concentrate contains from about 10–90 weight percent, preferably 35–75 weight percent, of the detergent in a mineral oil or polyolefin oligomer. When this concentrate is added to gasoline a fuel is provided which will maintain the entire induction system in a high degree of cleanliness.

Especially good results have been obtained when the hydrocarbon diluent employed in the concentrate is a polypropylene, a polybutene, an ethylene-propylene copolymer or one of the previously-described polyolefin oligomers made by polymerizing an olefin or mixture of olefinic hydrocarbons containing about 12 or more carbon atoms, preferably from 12–32 carbon atoms, to produce a liquid olefin polymer having an average molecular weight of about 300–1500.

The detergent concentrate can contain other additives normally used with gasoline, forming an additive "package". For example, the concentrate can contain gasoline antioxidants such as 2,6-di-tert-butylphenol, mixtures of butylated phenol such as those containing about 75 percent of 2,6-di-tert-butylphenol and 15 percent o-tert-butylphenol, N-isopropylphenylenediamine; phosphorus additives such as tricresylphosphate, trimethylphosphate, phenyldimethylphosphate, dimethylphenylphosphate, tris($\beta$-chloropropyl)phosphate, and the like; antiknock promoters such as tert-butyl acetate; de-icers such as methanol, isopropanol, n-butanol, isobutanol; tetraalkyllead antiknocks such as tetraethyllead, tetramethyllead, redistributed tetraethyltetramethyllead, and the like; scavengers such as ethylene dichloride, ethylene dibromide, dibromobutanes, and the like; other antiknock agents such as methyl cyclopentadienyl manganese tricarbonyl, ferrocene, methyl ferrocene, cyclopentadienyl nickel nitrosyl; N-methylaniline, and the like; metal deactivators such as N,N'-disalicylidene-1,2-diaminopropane; dyes; corrosion inhibitors, and the like.

The concentrates of this invention are readily prepared by merely blending the ingredients until a homogenous solution is obtained. The following examples illustrate the preparation of some typical concentrates for use in gasoline.

EXAMPLE 9

To a blending vessel is added 1000 parts of the detergent product from Example 1 and 1000 parts of a naphthenic mineral oil. The mixture is warmed and stirred until homogenous, forming an additive concentrate useful for improving the detergent properties of gasoline.

EXAMPLE 10

To a blending vessel is added 1000 parts of the detergent additive from Example 2 and 1500 parts of a polypropylene having an $\overline{M}n$ of about 1500. Then, 20 parts of a mixture of butylated phenols containing about 75 percent 2,6-di-tert-butylphenol are added. This mixture is stirred, forming a detergent package which also imparts antioxidant protection when added to gasoline.

The amounts of each ingredient in the foregoing compositions can be varied within wide limits to provide the optimum degree of each property.

Gasoline compositions of this invention can be prepared by merely adding the detergent in the proper amount to the gasoline base stock and stirring until dissolved. Likewise, the detergent can be injected into the gasoline stream in an in-line blending system either alone or in combination with other additives such as tetraalkyllead antiknocks. Similarly, the additive concentrate can be added to gasoline, furnishing not only the detergent but also the adjuvant (mineral oil or olefin oligomer). If desired, the detergent and adjuvant can be separately added to the base gasoline.

The following examples serve to illustrate the manner in which gasoline compositions of this invention are made. In these examples the gasoline base stocks have the following composition and properties.

| Fuel | RON | Boiling Range (°F.) Initial | Boiling Range (°F.) End Point | Composition % Aromatics | Composition % Olefins | Composition % Saturates |
|---|---|---|---|---|---|---|
| A | 91 | 91 | 390 | 40 | 1.5 | 58.5 |
| B | 86 | 100 | 400 | 35 | 2 | 63 |
| C | 87 | 95 | 410 | 36.5 | 2.5 | 61 |
| D | 95 | 89 | 395 | 49.5 | 2.5 | 48 |
| E | 97 | 105 | 415 | 54 | 1.5 | 44.5 |
| F | 90 | 96 | 389 | 39 | 3 | 58 |
| G | 94 | 87 | 395 | 51 | 0.5 | 48.5 |

EXAMPLE 11

In a blending vessel place 10,000 gallons of Gasoline A, 25 pounds of the detergent of Example 1, 100 pounds of a polybutene having an $\overline{M}n$ of about 1200, 96.5 pounds of tetraethyllead as a commercial antiknock fluid containing one theory of ethylene dichloride and 0.5 theory of ethylene dibromide, and 15.5 pounds of tricresylphosphate. Stir the mixture until thoroughly mixed. The resultant gasoline is a premium grade gasoline with good detergent properties.

EXAMPLE 12

In a blending vessel place 10,000 gallons of Gasoline E, 2.5 pounds of detergent of Example 3, and 50 pounds of a neutral mineral oil (viscosity 100 SUS at 100° F.). Stir the mixture, resulting in an unleaded gasoline having good detergent properties.

EXAMPLES 13-22

The above Examples 11 and 12 are repeated using each of Gasolines B, C, D, F and G.

EXAMPLE 23

To a blending vessel add 10,000 gallons of Gasoline B, 100 pounds of the additive package of Example 10, 84 pounds of tetraethyllead as a commercial antiknock fluid, and 4.8 pounds of trimethylphosphate. The mixture is stirred, giving a high quality gasoline of good detergent properties.

I claim:

1. A lubricating oil composition comprising a major amount of lubricating oil and a dispersant amount of a composition made by the process comprising reacting (a) one mole part of an aliphatic hydrocarbon-substituted phenol wherein said aliphatic hydrocarbon substituent has an average molecular weight of from about 650 to 5000, (b) from about 1 to 10 mole parts of a $C_{1-4}$ aldehyde, (c) from about 0.1 to 10 mole parts of an amine containing at least one HN< group capable of entering into a Mannich condensation reaction and (d) from about 0.1 to 50 mole parts of an alkylene oxide containing from 2 to about 6 carbon atoms.

2. A composition of claim 1 wherein said aliphatic hydrocarbon substituent is a polymer of a $C_{2-4}$ olefin.

3. A composition of claim 2 wherein said aldehyde is formaldehyde.

4. A composition of claim 3 wherein said nitrogen compound is an alkylene polyamine having the formula $H_2N + R_1 - NH)_{\overline{n}} H$ wherein n is an integer from 1 to about 6 and $R_1$ is a divalent hydrocarbon group containing 2 to about 4 carbon atoms.

5. A composition of claim 4 wherein said alkylene polyamine has an average composition corresponding to tetraethylenepentamine.

6. A composition of claim 5 wherein said hydrocarbon substituent is selected from the group consisting of polybutene and polypropylene.

7. A composition of claim 6 wherein said alkylene oxide is selected from the group consisting of ethylene oxide and propylene oxide.

8. A composition of claim 3 wherein said nitrogen compound is an N,N-dialkyl alkane diamine having the formula

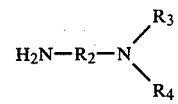

wherein $R_2$ is a divalent lower alkane group containing 2 to about 6 carbon atoms and $R_3$ and $R_4$ are independently selected from $C_{1-4}$ alkyl groups.

9. A composition of claim 8 wherein said nitrogen compound is N,N-dimethyl-1,3-propanediamine.

10. A composition of claim 9 wherein said hydrocarbon substituent is selected from the group consisting of polybutene and polypropylene.

11. A composition of claim 10 wherein said alkylene oxide is selected from the group consisting of ethylene oxide and propylene oxide.

12. A composition of claim 4 wherein said alkylene polyamine is diethylene triamine.

13. A composition of claim 12 wherein said alkylene oxide is ethylene oxide.

14. A composition of claim 13 wherein said hydrocarbon substituent is a polybutene substituent.

15. A composition of claim 13 wherein said hydrocarbon substituent is a polypropylene substituent.

16. A composition of claim 1 wherein said amine is selected from the group consisting of alkylene polyamines and N,N-dialkyl alkane diamines.

17. A composition of claim 1 wherein said hydrocarbon-substituted phenol, aldehyde and amine are reacted in any sequence or all at once and then the resultant reaction product is reacted with said alkylene oxide.

* * * * *